United States Patent
Mukaihara et al.

(10) Patent No.: US 10,895,217 B2
(45) Date of Patent: Jan. 19, 2021

(54) CONTROL APPARATUS FOR INTERNAL COMBUSTION ENGINE

(71) Applicant: HITACHI AUTOMOTIVE SYSTEMS, LTD., Hitachinaka (JP)

(72) Inventors: Osamu Mukaihara, Hitachinaka (JP); Masahiro Toyohara, Hitachinaka (JP); Shigeyuki Yufu, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 140 days.

(21) Appl. No.: 16/070,863

(22) PCT Filed: Jan. 19, 2017

(86) PCT No.: PCT/JP2017/001629
§ 371 (c)(1),
(2) Date: Jul. 18, 2018

(87) PCT Pub. No.: WO2017/135038
PCT Pub. Date: Aug. 10, 2017

(65) Prior Publication Data
US 2019/0017461 A1    Jan. 17, 2019

(30) Foreign Application Priority Data
Feb. 5, 2016   (JP) .................................. 2016-020592

(51) Int. Cl.
F02D 41/40    (2006.01)
F02P 5/15    (2006.01)
(Continued)

(52) U.S. Cl.
CPC .......... F02D 41/401 (2013.01); F02D 37/02 (2013.01); F02D 41/3082 (2013.01);
(Continued)

(58) Field of Classification Search
CPC .... F02D 41/401; F02D 37/02; F02D 41/3082; F02D 41/3845; F02D 41/40;
(Continued)

(56) References Cited

U.S. PATENT DOCUMENTS 5,960,765 A * 10/1999 Iida .................. F02D 37/02
123/295
5,970,947 A * 10/1999 Iida .................. F02D 41/1401
123/295
(Continued)

FOREIGN PATENT DOCUMENTS

| JP | H11-200935 A | 7/1999 |
| JP | 2003-222049 A | 8/2003 |
| JP | 2009-174344 A | 8/2009 |
| JP | 2012-117400 A | 6/2012 |
| JP | 2015-040535 A | 3/2015 |

OTHER PUBLICATIONS

International Search Report with English translation and Written Opinion issued in corresponding application No. PCT/JP2017/001629 dated Apr. 25, 2017.

*Primary Examiner* — Hung Q Nguyen
*Assistant Examiner* — Susan E Scharpf
(74) *Attorney, Agent, or Firm* — Foley & Lardner LLP

(57) ABSTRACT

Provided is a control apparatus for an internal combustion engine which can achieve required torque and avoid the risk of an accidental fire even in the case where an error occurs in final injection termination timing. A microcomputer calculates T902 which has been further advanced from T106 which precedes ignition timing by time required for vaporization of fuel injected into a cylinder of an internal combustion engine. The microcomputer determines whether final injection termination timing (T903) comes after T106 or T902. When it has been determined that final injection termination timing (T1204) comes after T106 or T902, the microcomputer controls an injector or an ignition device so as to secure time for vaporization of the fuel injected into the
(Continued)

cylinder of the internal combustion engine while satisfying a fuel injection amount required in one combustion cycle.

9 Claims, 7 Drawing Sheets

(51) Int. Cl.
*F02D 37/02* (2006.01)
*F02D 41/38* (2006.01)
*F02D 41/30* (2006.01)
*F02D 43/04* (2006.01)
*F02P 5/04* (2006.01)
*F02P 3/02* (2006.01)

(52) U.S. Cl.
CPC ....... *F02D 41/3845* (2013.01); *F02D 41/402* (2013.01); *F02D 43/04* (2013.01); *F02P 5/15* (2013.01); *F02D 41/40* (2013.01); *F02D 2200/101* (2013.01); *F02P 3/02* (2013.01); *F02P 5/045* (2013.01); *F02P 5/1502* (2013.01); *Y02T 10/40* (2013.01)

(58) Field of Classification Search
CPC .. F02D 41/402; F02D 43/04; F02D 2200/101; F02P 3/02; F02P 5/045; F02P 5/15; F02P 5/1502; Y02T 10/46
See application file for complete search history.

(56) References Cited

U.S. PATENT DOCUMENTS

| | | | |
|---|---|---|---|
| 9,702,316 B2* | 7/2017 | Iwai | F02D 41/1446 |
| 2003/0015168 A1* | 1/2003 | Yoshida | F02D 41/403 |
| | | | 123/295 |
| 2003/0070653 A1* | 4/2003 | Ogawa | F02D 41/047 |
| | | | 123/305 |
| 2004/0211388 A1* | 10/2004 | Hiraya | F02B 17/005 |
| | | | 123/276 |
| 2005/0155568 A1* | 7/2005 | Maitani | F02D 41/064 |
| | | | 123/295 |
| 2006/0016425 A1* | 1/2006 | Kono | F02D 41/0002 |
| | | | 123/305 |
| 2006/0065235 A1* | 3/2006 | Tomita | F02D 37/02 |
| | | | 123/305 |
| 2007/0023006 A1* | 2/2007 | Takeda | F02D 37/02 |
| | | | 123/305 |
| 2007/0074702 A1* | 4/2007 | Nakamura | F01N 11/002 |
| | | | 123/299 |
| 2011/0307164 A1* | 12/2011 | Arihara | F02D 35/026 |
| | | | 701/105 |
| 2012/0136555 A1* | 5/2012 | Okamoto | F02D 41/047 |
| | | | 701/104 |
| 2015/0114340 A1* | 4/2015 | Saito | F02D 13/0265 |
| | | | 123/294 |
| 2016/0281663 A1* | 9/2016 | Sasaki | F02F 3/24 |
| 2018/0058366 A1* | 3/2018 | Nagasawa | F02D 41/38 |

* cited by examiner (COMPARATIVE EXAMPLE)

CONTROL APPARATUS FOR INTERNAL COMBUSTION ENGINE

TECHNICAL FIELD

The present invention relates to a control apparatus for an internal combustion engine.

BACKGROUND ART

A control apparatus for an in-cylinder injection type internal combustion engine, which can prevent abnormal combustion in the process from compression stroke to ignition, has been known (see, for example, PTL 1).

PTL 1 describes "a control means has a phase control function to change and control the opening and closing timing of an intake valve so that the opening and closing timing thereof is advanced and retarded according to various conditions including artificial manipulation and emission conditions, while the control means performs fuel injection in several portions in an opening period of the intake valve to be changed, performs fuel injection of the last portion in a closing period of the intake valve in a manner in which injection of the entire amount of fuel is completed before a predetermined time, and sets the predetermined time in consideration of time required for vaporization of the last injection amount."

CITATION LIST

Patent Literature

PTL 1: JP 2009-174344 A

SUMMARY OF INVENTION

Technical Problem

In the technology as disclosed in PTL 1, there are a risk of not achieving required torque and also a risk of an accidental fire, in the case where an error occurs in the final injection termination timing.

An object of the present invention is to provide a control apparatus for an internal combustion engine which can achieve required torque and avoid the risk of an accidental fire even in the case where an error occurs in the final injection termination timing.

Solution to Problem

To achieve the above-described object, the present invention includes a calculation part which calculates second timing which has been further advanced from first timing which precedes ignition timing by time required for vaporization of fuel injected into a cylinder of an internal combustion engine; a determination part which determines whether final injection termination timing, which indicates timing of termination of final fuel injection in one combustion cycle, comes after the first timing or the second timing; and a first control part which controls an injector or an ignition device so as to secure time for vaporization of the fuel injected into the cylinder of the internal combustion engine while satisfying a fuel injection amount required in the one combustion cycle when it has been determined that the final injection termination timing comes after the first timing or the second timing.

Advantageous Effects of Invention

According to the present invention, it is possible to achieve required torque and avoid the risk of an accidental fire even in the case where an error occurs in the final injection termination timing. Other technical problems, configurations, and effects than those described above will be clarified below in the description of embodiments.

DESCRIPTION OF EMBODIMENTS

Figure 1:
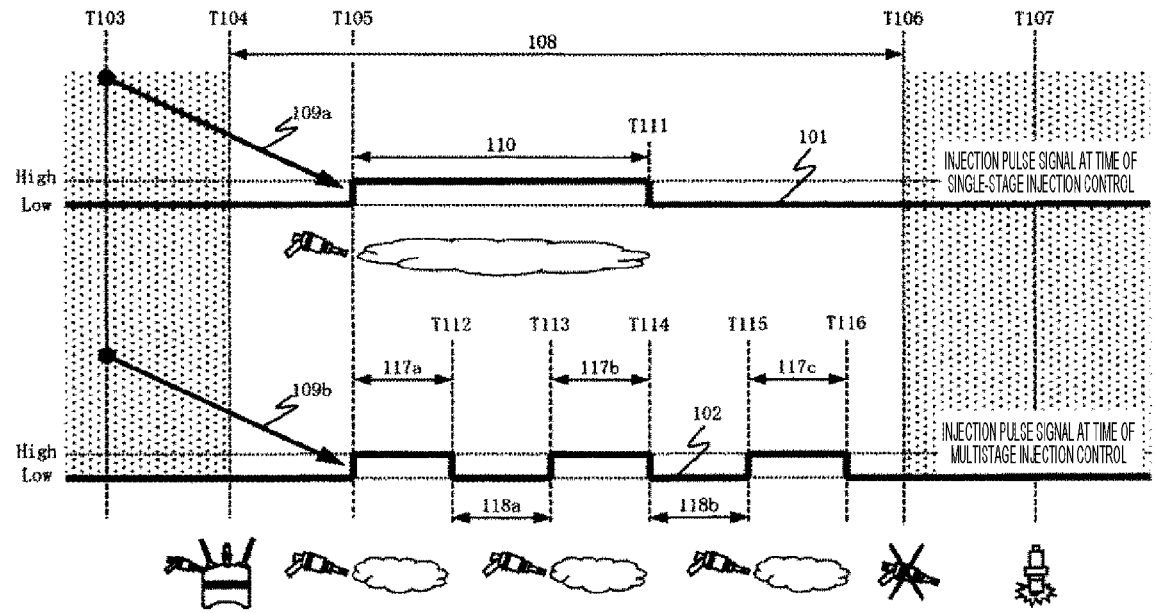
FIG. 1 is a diagram for illustrating injection control according to a comparative example.

Configurations and operations of control apparatuses for an internal combustion engine according to first to third embodiments of the present invention will be described below with reference to the drawings. It should be noted that the same reference signs refer to the same parts in each figure.

COMPARATIVE EXAMPLE

First, a comparative example for the control apparatuses for an internal combustion engine according to the first to third embodiments will be described with reference to FIGS. 1 and 2.

For the purpose of, for example, preventing deterioration in exhaust performance and reduction in output, and avoiding a risk of an accidental fire, a control apparatus for an internal combustion engine must satisfy various combustion requirements which are values different between internal combustion engines. In FIG. 1, 101 shows an example of an injection pulse signal in a general single-stage injection control.

First, injection start timing is determined (109a) at a reference position (T103) of injection control. When a crank angle of an internal combustion engine reaches injection start timing (T105), injection operation is started (the injection pulse signal (101) changes from low to high at T105). Then, based on a required injection amount of the internal combustion engine, an injection pulse width (110) that is a period, during which the injection pulse signal (101) is high, is calculated. The injection operation is terminated at the time of the calculated injection amount having been injected (T111).

Here, when the injection start timing (T105) is set prior to a valve-closing completion timing (T104) of an exhaust valve, fuel injected from a fuel injection valve (injector) is discharged to an exhaust pipe without burning. Thus, there is a concern about significant deterioration in exhaust performance. Meanwhile, when injection termination timing (T111) is in the vicinity of an ignition timing (T107), sufficient time for vaporization of injected fuel is not secured and, as a result, a desired air-fuel mixture cannot be formed. Moreover, in the worst case, fuel may adhere to a spark plug, and this can lead to an accidental fire.

Therefore, in consideration of, for example, time for vaporization of fuel, injection operation must be completed before a position (T106) which is advanced from the ignition timing (T107) by a predetermined period of time. It should be noted that in the present specification, a fuel injection period from T104 to T106, in which it is possible to prevent deterioration in exhaust performance and reduction in output and also possible to avoid a risk of an accidental fire, is referred to as an effective injection period (108). T104 is referred to as a start position of the effective injection period. T106 is referred to as an end position of the effective injection period.

Furthermore, in recent years, regulations have been newly provided particularly for particulate number (PN) and particulate matter (PM) along with severer exhaust regulations. The particulate matter (PN and PM) is generated by fuel having adhered to a piston crown surface or a bore in a combustion chamber without burning, after being injected from a fuel injection valve.

Accordingly, if adhesion of fuel can be reduced, the particulate matter (PN and PM) can be reduced. For example, the spray length (hereafter referred to as penetration) of the fuel injected from the fuel injection valve is reduced by multistage injection control, in which injection is performed multiple times in one combustion cycle, so that the injected fuel does not hit the piston crown surface or bore.

In FIG. 1, 102 shows an example of an injection pulse signal in the case of performing the multistage injection control.

First, in a manner similar to that of the single-stage injection, injection start timing is determined (109b) at the reference position (T103) of injection control. When a crank angle of the internal combustion engine reaches the injection start timing (T105), injection is performed. Then, an injection amount per injection (an amount of split injection) is calculated based on, for example, a split ratio, an intake air amount of the internal combustion engine, fuel pressure in a common rail, and a fuel injection amount calculated based on a constant specific to a fuel injection valve.

FIG. 1 shows an example of three-stage injection. Based on the above-described calculation of the amount of split injection, periods of 117a, 117b, and 117c are determined, and injection termination timing (T112, T114, and T116) for each injection stage is also determined. When multistage injection control is performed, injection intervals (118a and 118b) must be secured between injection operations. For example, when the injection intervals (118a and 118b) are short and a next injection command is issued before the valve body of the fuel injection valve completes valve-closing operation, valve-opening operation for the next injection starts during the valve-closing operation of the previous injection. As a result, operation of the valve body becomes unstable, and variation in the injection amount is caused.

Similarly, in the case of a fuel injection valve of an in-cylinder direct injection type internal combustion engine, the fuel injection valve is driven by battery voltage and high voltage which has been boosted from the battery voltage. When the high voltage decreases to a predetermined value or less, boosting operation is started. Accordingly, it is necessary to defer the next injection until the boosting operation is completed. If the next injection is performed before completion of the boosting operation, variation in a current profile of the fuel injection valve is caused by variation in the high voltage. As a result, variation in operation of the valve body of the fuel injection valve arises, resulting in variation in injection amount.

Therefore, with regard to injection start timing (T113 and T115) of the second and subsequent stages in the multistage injection control, calculation is performed in consideration of the injection intervals (118a and 118b). Furthermore, as a matter of course, the injection termination timing (T116) of the last stage tends to approach the end position (T106) of the effective injection period as the number of injection stages increases.

Also with regard to the single-stage injection, there may be a case where the final injection termination timing (T111) approaches the end position (T106) of the effective injection period in the case of high-load operation (a large intake air amount).

Figure 2:
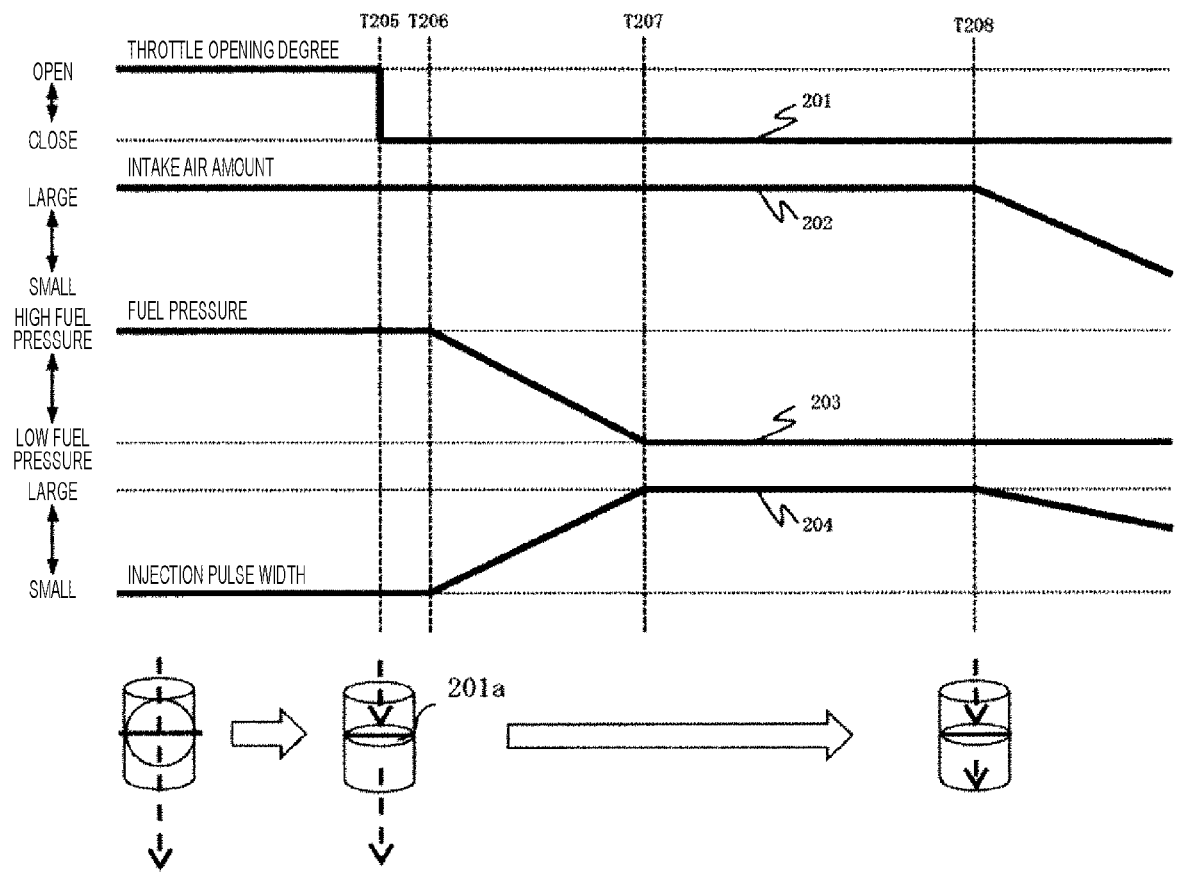
FIG. 2 is a diagram showing an example of the operating state of an internal combustion engine according to the comparative example.

FIG. 2 shows, from the top, throttle opening degree (201), an intake air amount (202) of an internal combustion engine, fuel pressure (203) in the common rail provided upstream of the fuel injection valve, and an injection pulse width calculation value (204). A throttle valve (201a) shown in FIG. 2 is changed from a fully open state to a fully closed state at T205. Accordingly, target fuel pressure of a high-pressure fuel pump changes in a low-pressure direction, and the fuel pressure (203) in the common rail rapidly decreases. Meanwhile, due to the effect of inertial force thus far, the intake air amount (202) does not decrease for a while (until T208 in FIG. 2).

Therefore, first, the injection pulse width calculation value (204) increases until T207 as the fuel pressure (203) decreases. The injection pulse width calculation value (204) stays at the same value as that of T207 until T208 at which the intake air amount (202) starts to decrease. Then, the injection pulse width calculation value (204) decreases in accordance with decrease of the intake air amount (202). Based on the above, there is a tendency that the injection pulse width (110) temporarily increases, and the injection termination timing (T111) approaches the end position (T106) of the effective injection period.

Completing all the fuel injection operations within the effective injection period (108), including the phenomena listed in FIGS. 1 and 2, is necessary as combustion requirement. In principle, it is a prerequisite that such phenomena are assured by performance of fuel system parts. In the conventional control, it is general to forcibly terminate fuel injection if injection operation continues until the end position (T106) of the effective injection period and thereafter.

First Embodiment

Figure 3:
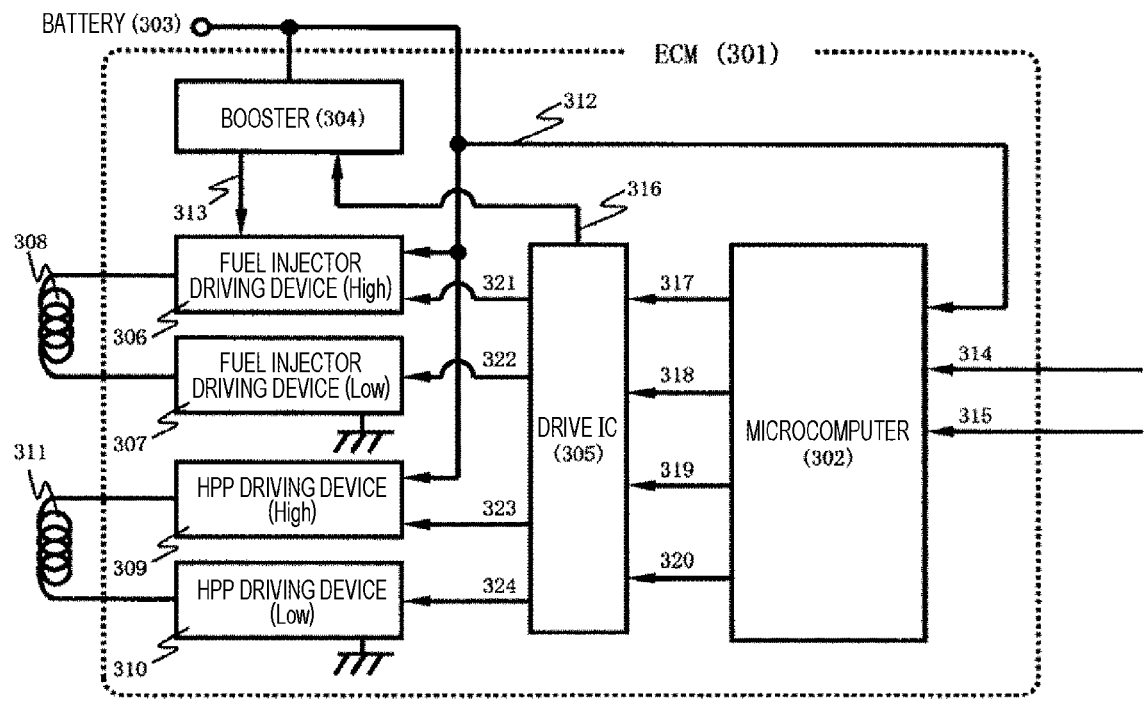
FIG. 3 is a configuration diagram of a control apparatus for an internal combustion engine according to a first embodiment of the present invention.

FIG. 3 shows a basic configuration example of a control apparatus for an internal combustion engine according to the first embodiment of the present invention.

The control apparatus for an internal combustion engine is provided in an engine control module (ECM) 301. Battery voltage (312) supplied from a battery (303) is supplied to the ECM (301) via a fuse (not shown) and a relay (not shown). Based on a command from a drive IC (305), a booster (304) boosts the battery voltage (312) to a target voltage which has been set in advance. The valve body of a fuel injection valve (308) can obtain valve opening force which is stronger than valve closing force generated by high fuel pressure, through the application of high voltage (313), generated as described above, when the fuel injection valve (308) starts operation.

Furthermore, based on operating states of an internal combustion engine such as an intake air amount (314) of the internal combustion engine, fuel pressure (315) in a common rail (not shown) provided upstream of the fuel injection valve (308), and the battery voltage (312), a microcomputer (302) calculates and outputs driving time and injection start/termination timing of the fuel injection valve (308) to the drive IC (305) as an injection pulse signal (317) for each cylinder. In addition, the microcomputer (302) selects driving current profiles (318 and 319) of the fuel injection valve (308) and a solenoid (311) for a high-pressure fuel pump from among the fuel pressure (315) and others, and outputs respective current control parameters corresponding to the driving current profiles (318 and 319) to the drive IC (305).

Moreover, based on the operating states and the like of the internal combustion engine, the microcomputer (102) outputs a driving signal (320) of the high-pressure fuel pump to the drive IC (305), as a signal to control fuel supplied from a fuel tank (not shown) to the high-pressure fuel pump (not shown) by use of an electric-powered pump (not shown), so that the fuel pressure (315) in the common rail achieves a desired pressure.

In order to drive the fuel injection valve (308), fuel injector driving devices are provided upstream (306) and downstream (307) of the fuel injection valve. High-precision current control is performed by control of a plurality of transistors provided to each of the driving devices (306 and 307) by use of switching signals (321 and 322). Similarly, driving devices are provided upstream (309) and downstream (310) of the solenoid (311) for a high-pressure fuel pump. Current control is performed by control of a plurality of transistors provided to each of the driving devices (309 and 310) by use of switching signals (323 and 324).

Next, an example of the function of the microcomputer (102) according to the present embodiment will be described with reference to FIG. 4.

Figure 4:
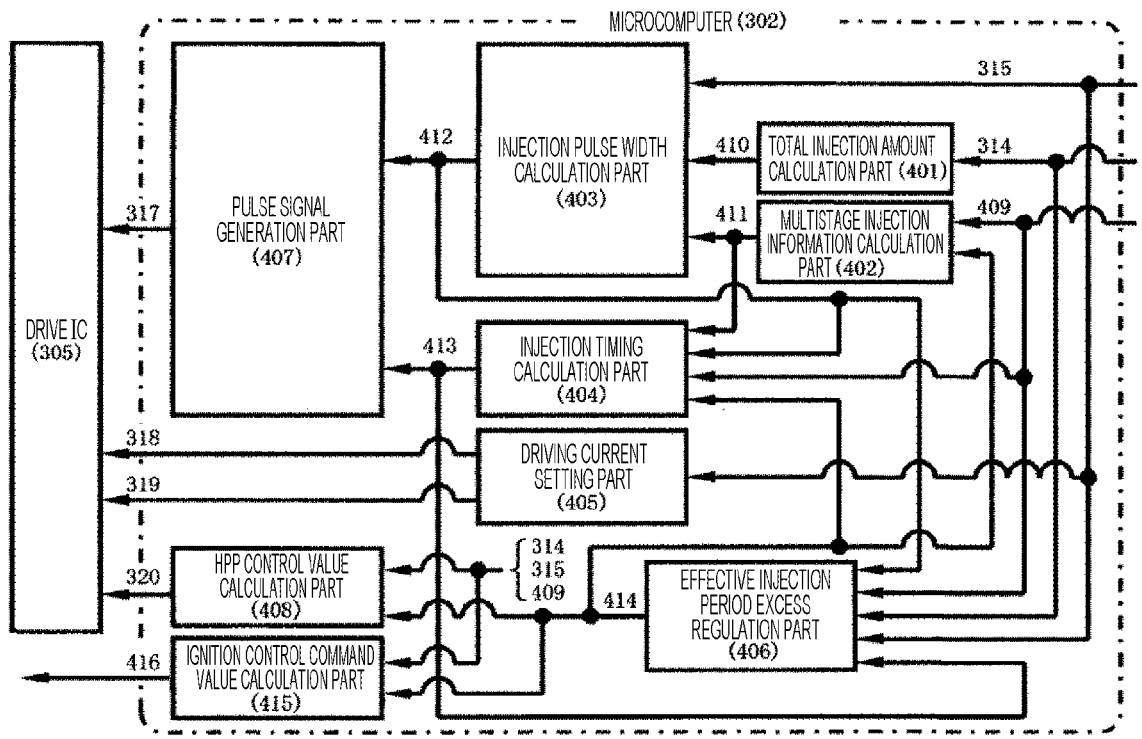
FIG. 4 is a block diagram for illustrating functions of a microcomputer shown in FIG. 3.

FIG. 4 shows functions provided in the microcomputer (302) shown in FIG. 3. First, a total injection amount calculation part (401) calculates a total fuel injection amount (410) required for one combustion cycle based on the intake air amount (314) of the internal combustion engine.

In the case of a control apparatus compliant to multistage injection, a multistage injection information calculation part (402) calculates multistage injection information (411) based on operating information (409) of the internal combustion engine represented by, for example, rotation speed, water temperature, and oil temperature. It should be noted that the number of times of injection, split ratio, and basic injection timing in one combustion cycle of the cylinder can be listed as multistage injection information referred to herein.

Then, an injection pulse width calculation part (403) calculates driving time (injection pulse width: 412) of the fuel injection valve from the fuel pressure (315), the total fuel injection amount (410), and the multistage injection information (411). It should be noted that in the case of a control apparatus compliant to multistage injection, a split injection pulse width is calculated for each injection stage.

Meanwhile, an injection timing calculation part (404) calculates driving start timing of the fuel injection valve (308) based on the operating information (409) of the internal combustion engine. In FIG. 4, description will be provided on the premise of using a control apparatus compliant to multistage injection.

Definite injection timing (413) is calculated based on requirements such as the multistage injection information (411) including basic injection timing calculated by the multistage injection information calculation part (402), the injection pulse width (412) calculated by the injection pulse width calculation part (403), and the injection intervals (118a and 118b) described above. It should be noted that in the case of the control apparatus compliant to multistage injection, the definite injection timing (413) is calculated and output to the drive IC (305) as the injection pulse signal (317) for each injection stage.

Furthermore, based on the fuel pressure (315), a driving current setting part (405) determines the driving current profile (318) of the fuel injection valve (308) and the driving current profile (319) of the solenoid (311) for a high-pressure fuel pump. The driving current setting part (405) outputs information thereof to the drive IC (305).

An HPP control value calculation part (408) calculates a driving command value of the solenoid (311) for a high-pressure fuel pump from the intake air amount (314) of an internal combustion engine and the operating information (409) of the internal combustion engine. In addition, the HPP control value calculation part (408) performs so-called feedback control with respect to the fuel pressure (315) and target fuel pressure.

An ignition control command value calculation part (415) calculates ignition timing by performing predetermined calculation based on, for example, the intake air amount (314) of an internal combustion engine, the fuel pressure (315), and the operating information (409) of the internal combustion engine. The ignition control command value calculation part (415) also calculates energization start timing by dividing energization time required for an ignition coil from the ignition timing. Then, the ignition control command value calculation part (415) outputs an ignition signal (416).

As a characteristic of the present embodiment, an effective injection period excess regulation part (406) is provided. The effective injection period excess regulation part (406) outputs a control command change value (414) to the multistage injection information calculation part (402), the injection timing calculation part (404), and the HPP control value calculation part (408) when it is determined that final injection termination timing (T111 or T116 in FIG. 1) comes after the end position (T106) of the effective injection period according to the injection pulse width (412), the definite injection timing (413), the fuel pressure (315), the operating information (409) of the internal combustion engine, and the intake air amount (314) of the internal combustion engine.

Based on the control command change value (414), the multistage injection information calculation part 402, the injection timing calculation part 404, and the HPP control value calculation part 408 each complete fuel injection within the effective injection period while satisfying the required injection amount of the internal combustion engine.

Alternatively, the following measure is also effective. The effective injection period excess regulation part (406) outputs the control command change value (414) to the ignition control command value calculation part (415), and the ignition control command value calculation part (415) retards ignition timing. It should be noted that a specific control method will be described below.

Figure 5:
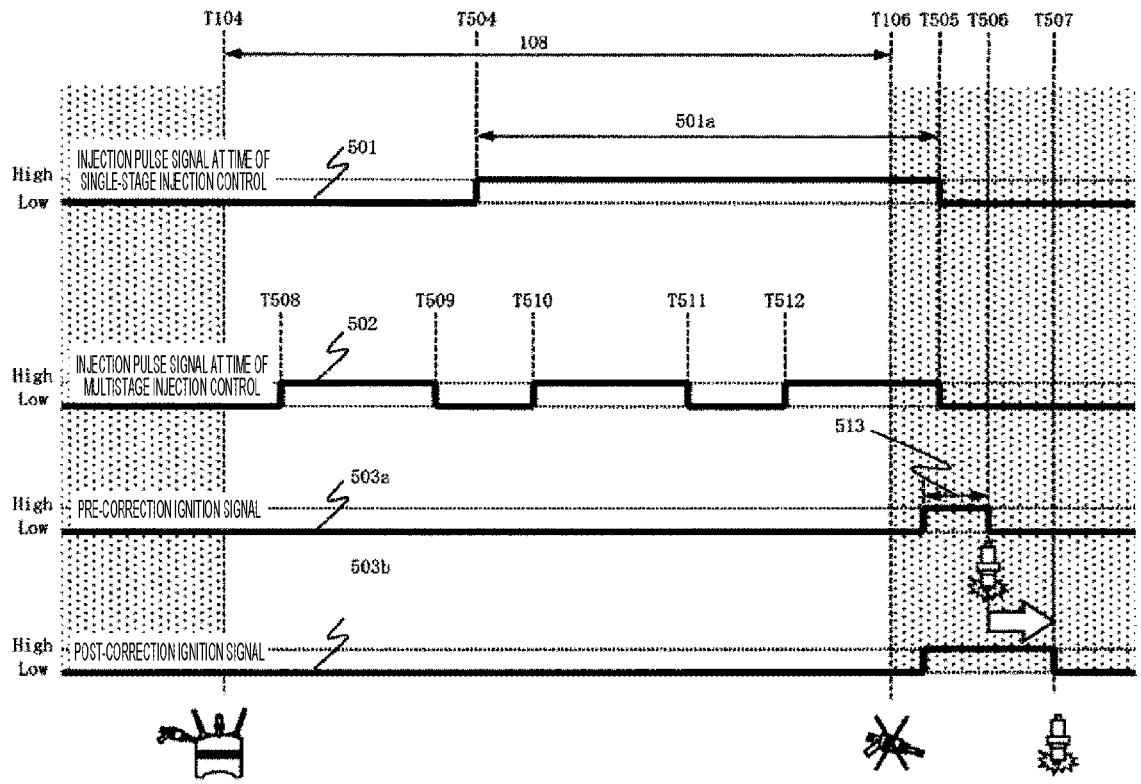
FIG. 5 is a diagram for illustrating an example of control by an effective injection period excess regulation part shown in FIG. 4.

Next, an example of control using the effective injection period excess regulation part (406) will be describe with reference to FIG. 5.

FIG. 5 shows, from the top, an injection pulse signal (501) at the time of single-stage injection control, an injection pulse signal (502) at the time of multistage injection control, a pre-correction ignition signal (503a), and a post-correction ignition signal (503b). The pre-correction ignition signal (503a) refers to ignition timing obtained by predetermined calculation from, for example, the operating information (409) of the internal combustion engine described above.

First, in the case of single-stage injection shown in the example of FIG. 5, if an injection pulse width (501a) is determined at the point of time at which injection start timing has come (T504), it is understood, at this point of time (T504), that final injection termination timing (T505) comes after the end position (T106) of the effective injection period. Therefore, the effective injection period excess regulation part (406) performs control so that ignition timing (T506) is retarded and ignition occurs at T507.

In other words, the microcomputer (302) functions as a first control part to control an ignition device so as to secure time for vaporization of fuel injected into a cylinder of the internal combustion engine while satisfying a fuel injection amount required in one combustion cycle when it has been determined that the final injection termination timing (T505) comes after T106 (first timing). In the present embodiment, the microcomputer (302) as the first control part retards the ignition timing (T506).

Accordingly, although injection cannot be completed within the effective injection period (108), sufficient time can be secured from the injection termination timing (T505) to the ignition timing (T507). As a result, it is possible to vaporize the injected fuel, and avoid a risk of an accidental fire.

Furthermore, since the fuel injection amount required in one combustion cycle is satisfied, required torque can be achieved even in the case where an error occurs in the final injection termination timing.

Moreover, also in the case of multistage injection control, it is possible to obtain an effect similar to that of the single-stage injection control by performing the above-described processing when it has been determined that the final injection termination timing (T505) comes after the end position (T106) of the effective injection period, at any one of the injection start timing (T508, T510, and T512) and the injection termination timing (T509, T511, and T513) for each injection operation, with regard to the injection pulse signal (502) for multistage injection control.

It should be noted that the point of time, at which it is determined that the final injection termination timing (T505) comes after the end position (T106) of the effective injection period, is not limited to the above-described timing. A similar effect can be achieved also in the case of, for example, the above-described determination being made in the process of performing injection (T504 to T505 or T508 to T505) unless the final injection termination timing (T505) comes after the ignition timing (T507).

As described above, according to the present embodiment, it is possible to achieve required torque and avoid the risk of an accidental fire even in the case where an error occurs in the final injection termination timing.

Second Embodiment

Next, another embodiment will be described with reference to FIG. 6.

Figure 6:
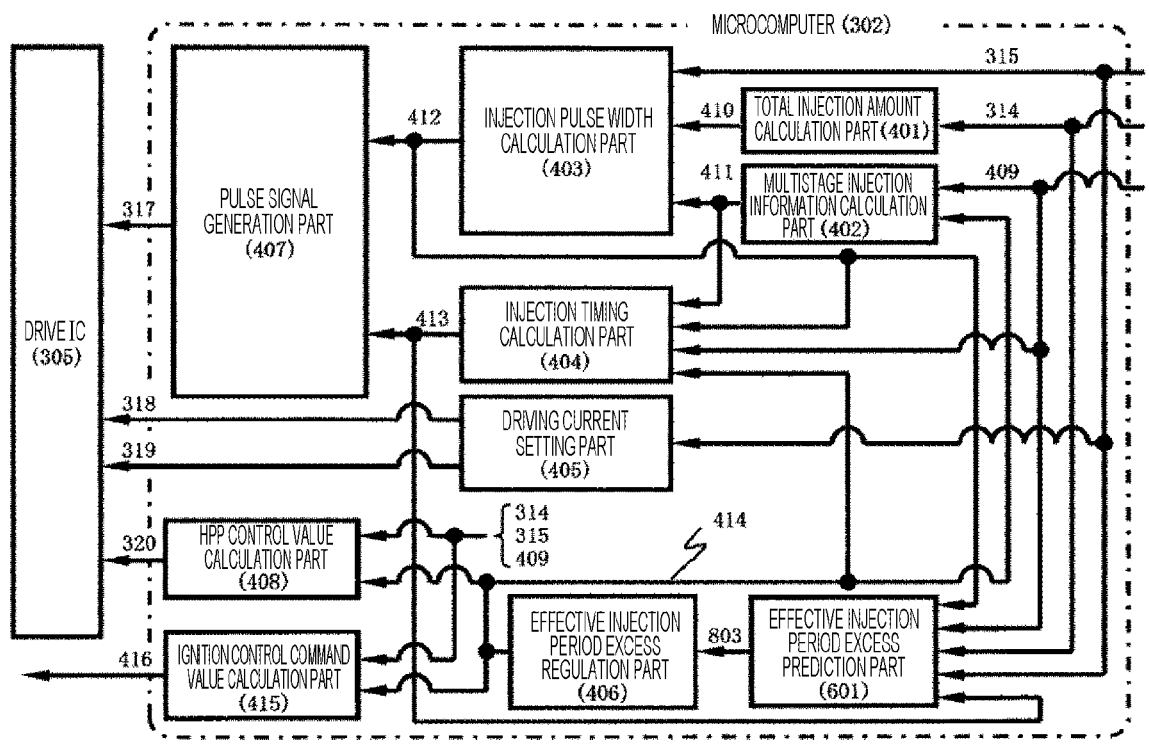
FIG. 6 is a configuration diagram of a control apparatus for an internal combustion engine according to a second embodiment of the present invention.

FIG. 6 shows a basic configuration of a control apparatus for an internal combustion engine according to the second embodiment of the present invention. In contrast to the configuration illustrated in FIG. 4, that illustrated in FIG. 6 includes an effective injection period excess prediction part (601).

In the configuration of FIG. 4, the control command change value (414) from the effective injection period excess regulation part (406) is activated when it is determined that the final injection termination timing (T505) comes after the end position (T106) of the effective injection period, However, when fuel injection is to be completed within the effective injection period (108), determination needs to be made early. Otherwise, there is a risk that control is not performed in time even if the control command change value (414) is activated.

Accordingly, the effective injection period excess prediction part (601) determines, prior to the timing at which initial injection starts, whether the injection operation is performed beyond the effective injection period (108).

Figure 7:
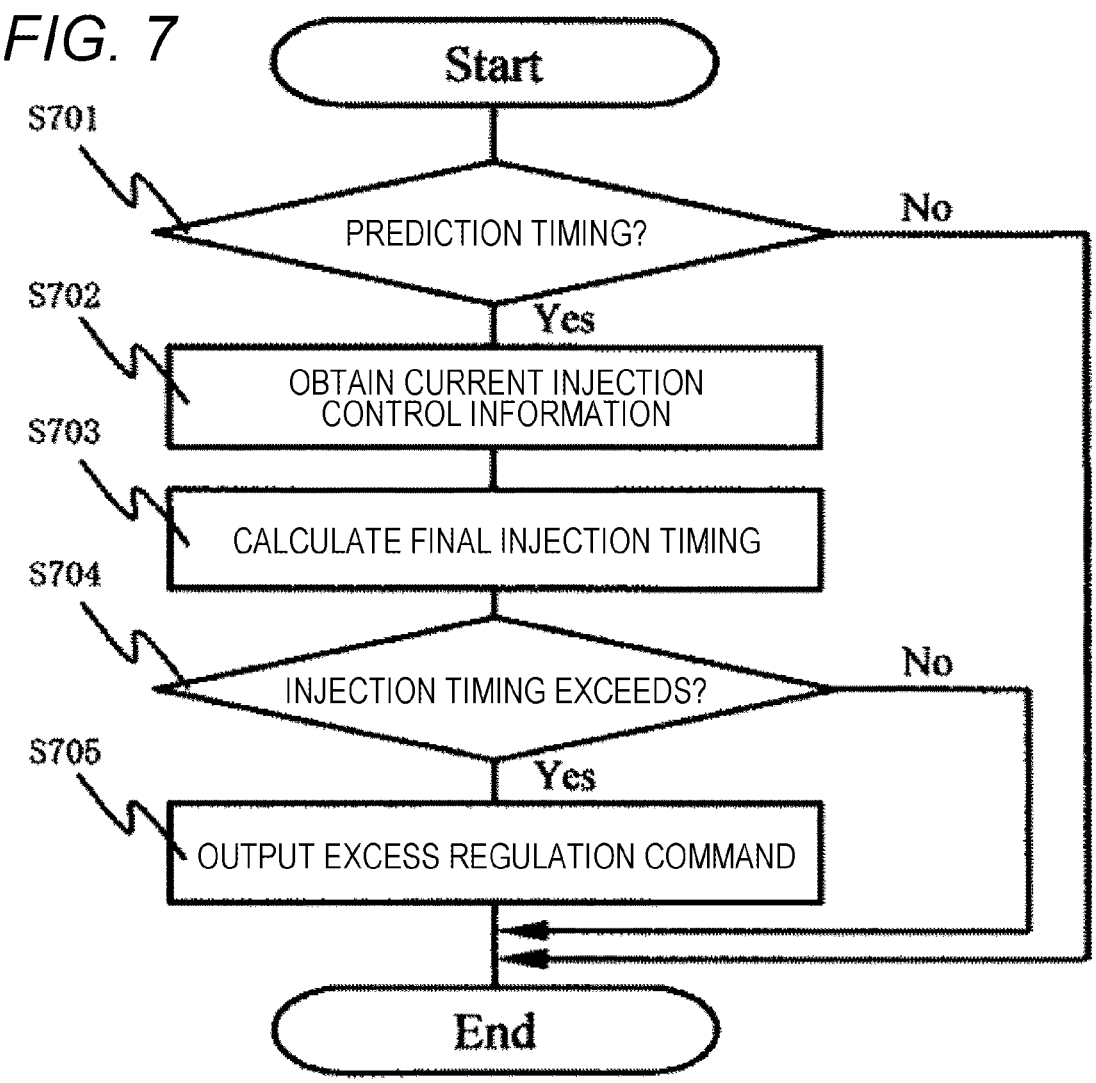
FIG. 7 is a flowchart of an effective injection period excess prediction part shown in FIG. 6.

FIG. 7 is a flowchart of the effective injection period excess prediction part (601).

First, whether prediction timing (timing to start prediction) has come is determined in S701. With regard to the prediction timing, as prediction is made earlier, the number of control methods using the effective injection period excess regulation part (406) increases, and a better effect can be expected. However, qualitative prediction accuracy deteriorates. In the embodiment of the present invention, this point is defined as being prior to initial injection start timing. When it has been determined that prediction timing has come (S701: Yes), the process proceeds to S702. When the determination condition is not satisfied (S701: No), no action is taken.

Next, injection control information at the prediction timing is obtained in S702. Specifically, the injection control information is latest information as of the prediction timing, which includes the above-described injection pulse width (412), the fuel pressure (315), the operating information (409) of the internal combustion engine, and the intake air amount (314) of the internal combustion engine.

Next, in S703, final injection termination timing in one combustion cycle of the cylinder is calculated from the injection control information obtained in S702. The calculation is performed in the above-described manner. Meanwhile, it is possible to improve calculation accuracy by, for example, predicting acceleration and deceleration based on rotation speed of the internal combustion engine saved for a predetermined period.

In other words, the microcomputer (302) functions as a prediction part for predicting the final injection termination timing prior to the timing at which initial fuel injection starts in one combustion cycle. As the prediction part, the microcomputer (302) may predict the final injection termination timing based on the rotation speed of the internal combustion engine, as will be described below with reference to FIG. 11.

Then, in S704, it is determined whether the final injection termination timing calculated in S703 comes after the end position (T106) of the effective injection period, which has been set in advance. When the determination condition is not satisfied (S704: No), no action is taken. When the determination condition is satisfied (S704: Yes), the process proceeds to S705. In S705, an excess regulation command including the control command change value (414) is output to the effective injection period excess regulation part (406).

For example, it is possible to adopt a method in which the effective injection period excess regulation part (406) performs a specific regulation method by setting a control flag and the like. It is also possible to adopt another method in which the control command change value (414) is output after being associated with an identifier (ID) for each control part in the case of using the control command change value (414).

Next, the effective injection period excess prediction part (601) will be described in detail with reference to FIG. 8.

Figure 8:
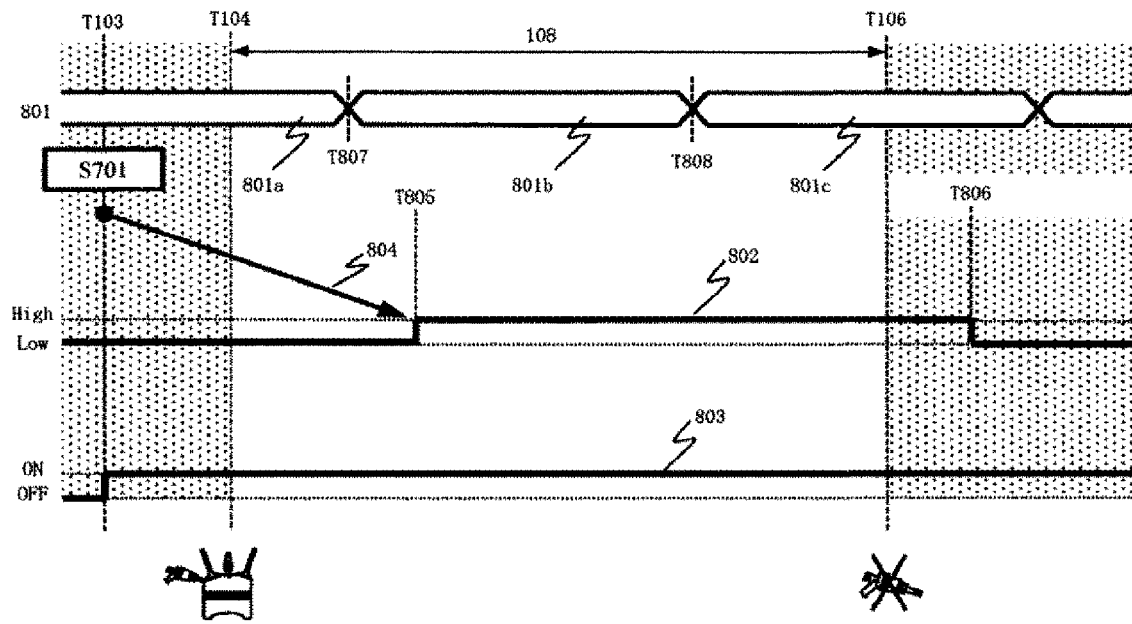
FIG. 8 is a diagram for illustrating operation of the effective injection period excess prediction part shown in FIG. 6.

FIG. 8 shows, from the top, a fixed time JOB calculation result (801), an injection timing prediction result (802), and an excess regulation command (803). First, the injection start timing is determined (804) at the reference position (T103) of injection control. In the present embodiment, processing of S701 is performed at this timing (T103).

A period from T104 to T106 is the above-described effective injection period (108). The fixed time JOB calculation result (801) includes calculation of respective control parameters used for fuel injection control, control of a solenoid of a high-pressure fuel pump, ignition control, and the like, as described with reference to FIG. 4, and also input processing by, for example, a sensor. In addition, since the processing is performed at fixed time intervals (in a predetermined cycle), calculation values are updated at, for example, T807 and T808. At 801a, 801b, and 801c, the respective updated calculation values are retained. The injection control information obtained in S702 of FIG. 7 corresponds to 801a in the example of FIG. 8.

Next, FIG. 8 schematically shows the injection timing prediction result (802) as an injection pulse signal. The injection start timing (T805) and the injection termination timing (T806) may be calculated based on the injection control information of 801a. Furthermore, since single-stage injection is assumed in FIG. 8, T806 is a predicted value of the final injection termination timing.

In S704 of FIG. 7, it is determined whether the predicted final injection termination timing (T806) comes after the end position (T106) of the effective injection period. In the example of FIG. 8, it can be predicted that the determination condition is satisfied (S704: Yes), and thus the excess regulation command (803) is set at T103. Due to the above-described processing, it is possible to determine whether the final injection termination timing (T806) comes after the effective injection period (108) prior to injection operation.

It should be noted that since the final injection termination timing (T806) is a predicted value, there is a risk that the predicted value may deviate from a control effective value due to change in, for example, the fuel pressure (315), the operating information (409) of the internal combustion engine, and the intake air amount (314) of the internal combustion engine after the time point of prediction (T103). An embodiment to solve the problem will be described with reference to FIG. 9.

(First Variation)

Figure 9:
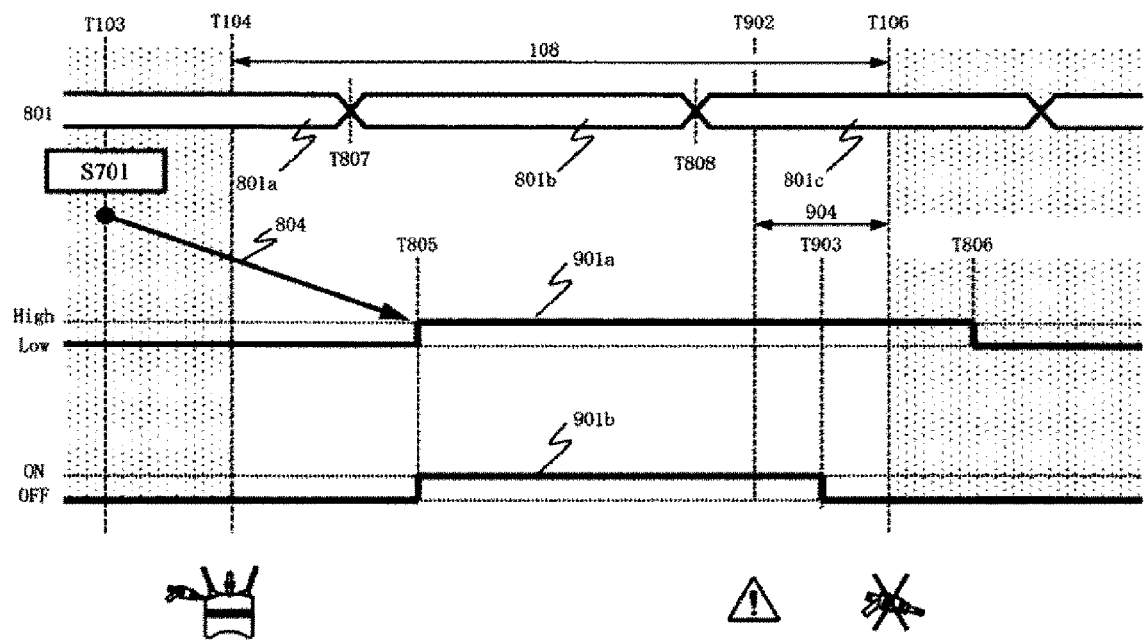
FIG. 9 is a diagram for illustrating operation of an effective injection period excess prediction part according to a first variation.

FIG. 9 illustrates a method of making an appropriate determination even if an error occurs in a prediction result of the effective injection period excess prediction part (601).

FIG. 9 shows, from the top, the fixed time JOB calculation result (801), an injection timing prediction result 1 (901a), and an injection timing prediction result 2 (901b). Since the present configuration basically overlaps that described with reference to FIG. 8, only the difference will be described below. First, as a characteristic of the present configuration, T902 is set as a position which has been advanced from the end position (T106) of the effective injection period by a predetermined period (904). The position (T902) is defined as an injection excess warning position.

In other words, the microcomputer (302) functions as a calculation part to calculate T902 (second timing) which is further advanced from T106 (first timing) which precedes ignition timing by time required for vaporization of the fuel injected into the cylinder of the internal combustion engine.

In addition, the predetermined period of time (904) is set by, for example, a method of reflecting a rotational error based on the understanding of the slope of increase or decrease of rotation speed.

Furthermore, when it has been determined, from the injection timing prediction result 1 (901a) predicted at T103, that the final injection termination timing (T806) comes after the end position (T106) of the effective injection period, the excess regulation command (803) including the control command change value (414) is output to the effective injection period excess regulation part (406) in a manner similar to the processing shown in FIG. 8.

Meanwhile, as in the case of the injection timing prediction result 2 (901b), when it is predicted, at T103, that the final injection termination timing (T903) comes after the injection excess warning position (T902) and before the end position (T106) of the effective injection period, an excess warning regulation command is output to the effective injection period excess regulation part (406).

In other words, the microcomputer (302) functions as a determination part to determine whether the final injection termination timing (T903), which indicates the timing of termination of the last fuel injection in one combustion cycle, comes after T106 (the first timing) or T902 (the second timing).

It should be noted that although the excess warning regulation command and the excess regulation command (803) are treated as different commands in the present embodiment, the embodiment of the present invention achieves the same effect even if the above-described commands are identical or either one of the commands is used.

According to the present variation, it is possible to achieve required torque and avoid the risk of an accidental fire even in the case where an error occurs in the predicted final injection termination timing.

(Second Variation)

Next, the effective injection period excess regulation part (406) according to the present embodiment will be described with reference to FIG. 10.

Figure 10:
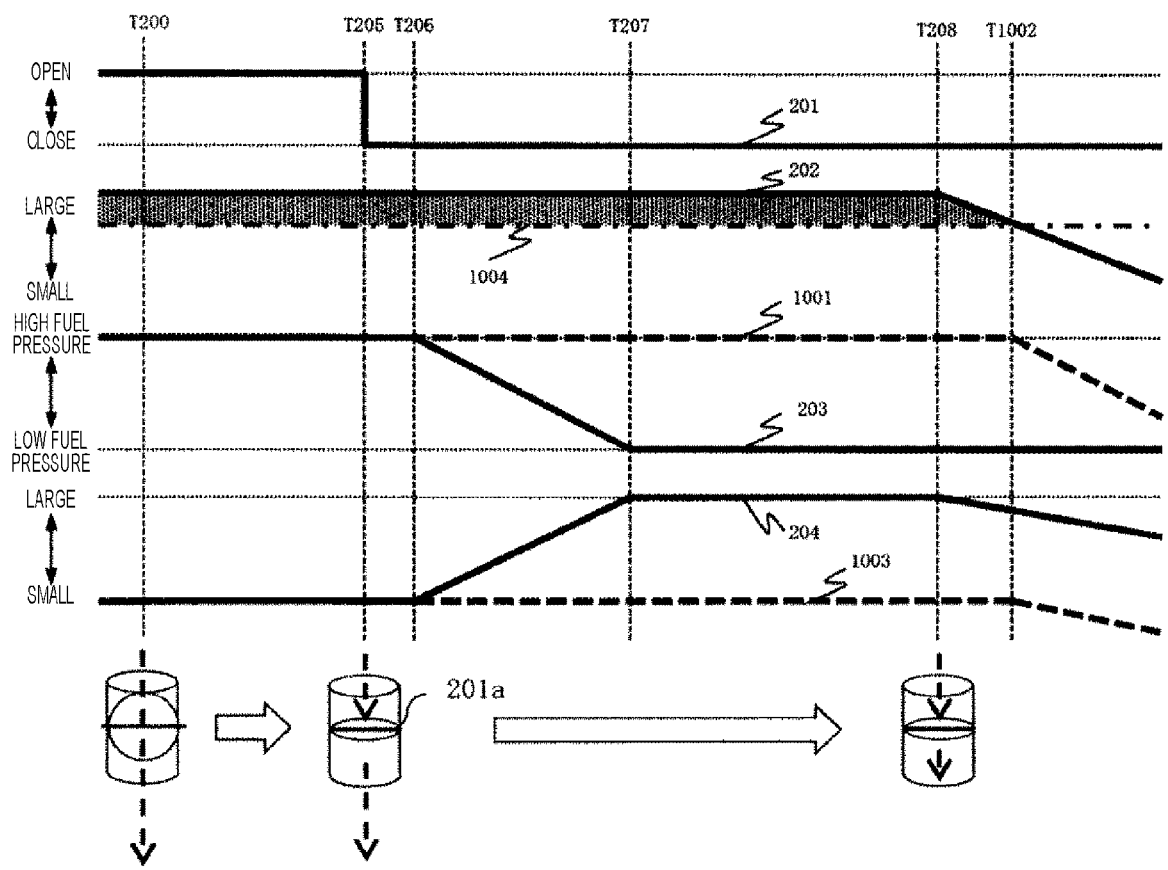
FIG. 10 is a diagram for illustrating operation of an effective injection period excess regulation part according to a second variation.

FIG. 10 is a timing chart described with reference to FIG. 2. FIG. 10 shows, from the top, throttle opening degree (201), an intake air amount (202) of an internal combustion engine, fuel pressure (203) in the common rail provided upstream of the fuel injection valve, and an injection pulse width calculation value (204). Since the problem relating to FIG. 2 has been described above, further description will be omitted here.

First, at T200, the intake air amount (202) of the internal combustion engine reaches or exceeds a predetermined value (1004) set in advance. Since at T205, the throttle opening degree changes in the closing direction and a required injection amount decreases, target fuel pressure is controlled to decrease. As a result, the fuel pressure (203) decreases starting from T206. Meanwhile, the injection pulse width calculation value (204) increases due to correction caused by the fuel pressure (203). The final injection termination timing (T806 or T903) comes after the injection excess warning position (T902) or the effective injection period (108). The excess warning regulation command or the excess regulation command (803) is input to the effective injection period excess regulation part (406).

The effective injection period excess regulation part (406) issues, to the ignition control command value calculation part (415), a command as the excess warning regulation command or the excess regulation command (803) so as to increase or not to change the target fuel pressure until the intake air amount (202) of the internal combustion engine becomes equal to or less than the predetermined value (1004). It should be noted that a dashed line (1001) extending over the period from T206 to T1002, as shown in FIG. 10, shows an example in which the target fuel pressure is not changed until the intake air amount (202) of the internal combustion engine becomes equal to or less than the predetermined value (1004).

In other words, the microcomputer (302) functions as a second control part which sets, as target fuel pressure, a value equal to or more than the target fuel pressure at the time of a throttle valve (201*a*) being fully closed, and controls a high-pressure fuel pump so that fuel pressure agrees with the target fuel pressure from the timing (T205), at which the throttle valve (201*a*) is fully closed, to the timing (T1002), at which the intake air amount of the internal combustion engine becomes equal to or less than the predetermined value (1004).

Therefore, the fuel pressure (203) shows transition as the dashed line 1001, and maintains the state until T1002 at which the intake air amount (202) of the internal combustion engine becomes equal to or less than the predetermined value (1004) set in advance.

Since fuel pressure does not decrease, the injection pulse width calculation value (204) shows transition as a dashed line 1003. The fuel pressure is maintained while an increase in injection pulse width is controlled. As a result, it is possible to satisfy the injection amount required by the internal combustion engine.

Furthermore, if further reduction of a pulse width is necessary on another occasion, it is possible to reduce the pulse width by increasing fuel pressure.

According to the present variation, it is possible to prevent lean burn after the timing (T205) at which the throttle valve (201*a*) is fully closed.

As described above, according to the second embodiment, it is possible to achieve required torque and avoid the risk of an accidental fire even in the case where an error occurs in the final injection termination timing.

Third Embodiment

Figure 11:
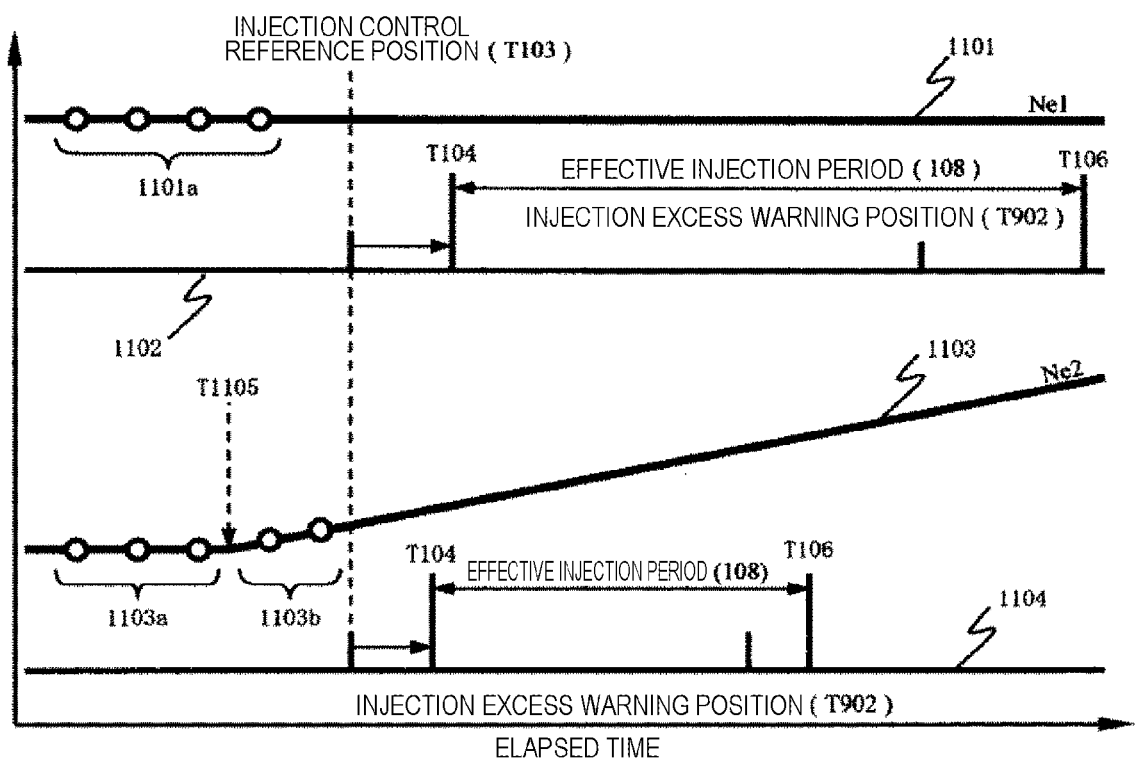
FIG. 11 is a diagram for illustrating operation of an effective injection period excess prediction part according to a third embodiment of the present invention.

The third embodiment of the present invention will be described with reference to FIG. 11.

Lines numbered 1101 and 1103 represent the rotation speed of the internal combustion engine with time on the horizontal axis. Lines numbered 1102 and 1104 represent respective positions relating to injection control with time on the horizontal axis.

First, 1101 shows a case of a constant rotation speed, and 1101*a* shows the timing at which the rotation speed of the internal combustion engine is calculated in fixed time processing (for example, every 10 ms).

In addition, the injection control reference position (T103), the start position (T104) of the effective injection period, the end position (T106) of the effective injection period, and the injection excess warning position (T902) shown on the line 1102 are originally determined based on the crank angle of the internal combustion engine. Since the rotation speed of the internal combustion engine is constant, their positional relationship does not change over time. Therefore, even if the end position (T106) of the effective injection period and the injection excess warning position (T902) are predicted based on the injection control reference position (T103), for example, no error occurs theoretically.

However, in the case where the rotation speed changes (increases in the figure) starting from T1105 as shown by 1103, an error occurs if the injection control reference position (T103), the start position (T104) of the effective injection period, and the end position (T106) of the effective injection period shown on the line 1104 are predicted from the rotation speed calculated in the fixed time processing of 1103*a*.

Therefore, processing including prediction of future rotation speed is performed based on, for example, the difference between the rotation speed calculated the previous time or the time before the previous time and that calculated this time, in addition to the rotation speed calculated in the fixed time processing of 1103*b*. Then, the injection control reference position (T103), the start position (T104) of the effective injection period, the end position (T106) of the effective injection period, and the injection excess warning position (T902) shown on the line 1104 are predicted.

As a matter of course, since the rotation speed changes (increases in the figure), the intervals between the injection control reference position (T103), the start position (T104) of the effective injection period, the end position (T106) of the effective injection period, and the injection excess warning position (T902) shown in the figure decrease as time passes. Conversely, when the rotation speed decreases, the above-described intervals increase as time passes. Therefore, it is desirable to predict the positions based on calculation represented by the above-described correction. As a matter of course, also with regard to the predetermined period of time (904) provided between the end position (T106) of the effective injection period and the injection excess warning position (T902) shown in FIG. 9, it is possible to more efficiently obtain the effect of the embodiment of the present invention by considering a gap caused by the errors.

(Third Variation)

Figure 12:
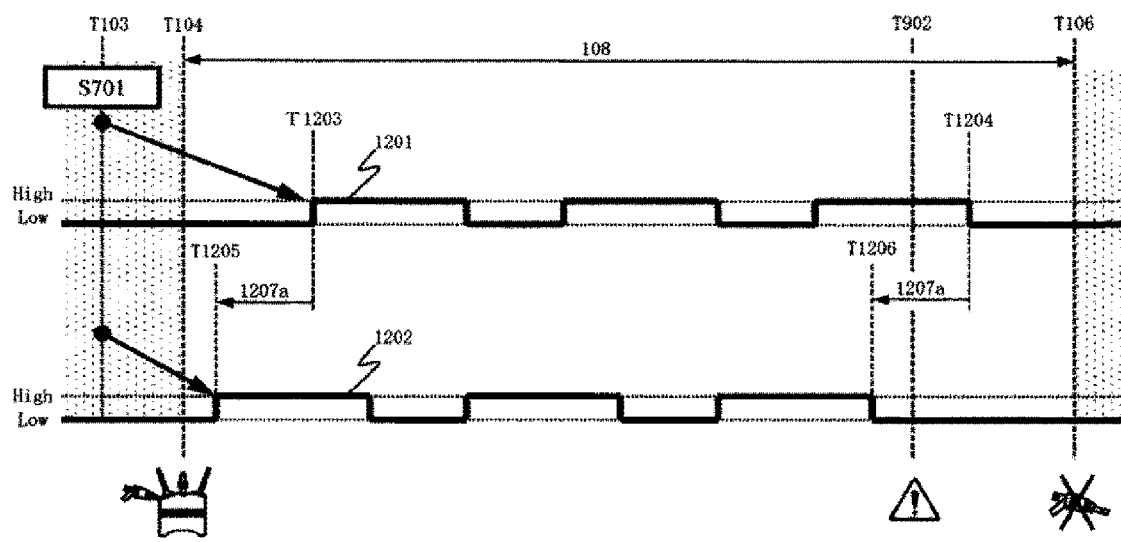
FIG. 12 is a diagram for illustrating operation of an effective injection period excess regulation part according to a third variation.

Based on the above, FIG. 12 will be described below. FIG. 12 shows injection timing in the case of performing injection three times (three-stage injection) for the cylinder. Line 1201 shows injection timing calculated in normal calculation.

Based on the injection control information as of T103, it is predicted that injection is performed three times in total, starting from T1203, at which the initial injection starts, until final injection termination timing (T1204). In the processing of S704, it is predicted that the final injection termination timing (T1204) of 1201 comes after the injection excess warning position (T902). Therefore, the effective injection period excess regulation part (406) causes the control command change value (414) to advance initial injection start timing by a period of time 1207*a*. As a result, subsequent injection timing is also advanced by the period of time 1207*a* to form an injection pulse signal as represented as 1202.

In other words, the microcomputer (302) functions as a first control part to control an injector so as to secure time for vaporization of fuel injected into a cylinder of the internal combustion engine while satisfying a fuel injection amount required in one combustion cycle when it has been determined that the final injection termination timing (T1204) comes after T902 (second timing).

Therefore, it is possible to achieve required torque and avoid the risk of an accidental fire even in the case where an error occurs in the final injection termination timing.

In the present embodiment, the microcomputer (302) as the first control part advances the timing at which the initial fuel injection starts in one combustion cycle when it has been determined that the final injection termination timing (T1204) comes after T902 (the second timing).

As a result, the final injection termination timing is changed to T1206, and does not come after the injection excess warning position (T902). It is possible to perform all the injections within the effective injection period (108) by changing the injection mode in advance.

(Fourth Variation)

Figure 13:
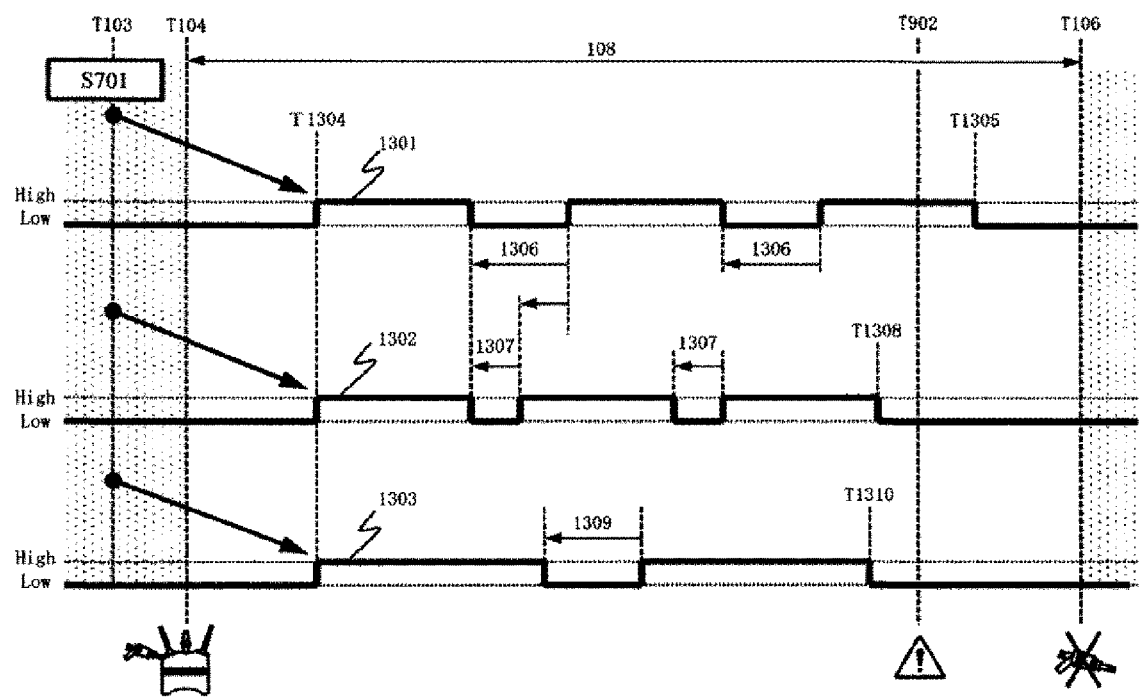
FIG. 13 is a diagram for illustrating operation of an effective injection period excess regulation part according to a fourth variation.

Next, another method regarding the effective injection period excess regulation part (406) and the control command change value (414) will be described with reference to FIG. 13.

Since the same thing can be said about 1301 as 1201 shown in FIG. 12, detailed description of 1301 will be omitted here. Based on the injection control information as of T103, it can be predicted that final injection termination timing (T1305) comes after the injection excess warning position (T902).

Therefore, the effective injection period excess regulation part (406) outputs the control command change value (414) as a command to reduce injection intervals (1306). As a result, the injection intervals as represented as 1307 on 1302 are obtained. As a result, the final injection termination timing is changed to T1308, and does not come after the injection excess warning position (T902).

In other words, the microcomputer (302) functions as the first control part to reduce injection intervals per combustion cycle when it has been determined that the final injection termination timing (T1305) comes after T902 (the second timing) in the process of multistage injection control.

It should be noted that in this method, an allowable range of reduction in the injection intervals (1306) is restricted by characteristics of the fuel injection valve and those of the control apparatus. Therefore, it is possible to reduce, as represented as 1303, the number of times of injection (reduced from three times to two times of injection in the figure) and an injection interval (T1309) by use of the control command change value (414) so that the final injection termination timing is changed to T1310, and does not come after the injection excess warning position (T902).

In other words, the microcomputer (302) functions as the first control part to reduce the number of times of injection per combustion cycle when it has been determined that the final injection termination timing (T1305) comes after T902 (the second timing) in the process of multistage injection control.

It is desirable that selection from among the above-described methods can be made in consideration of influence on another performance by the control command change value (414) based on, for example, the operating state of the internal combustion engine.

The cases where the final injection termination timing (T1204 and T1305) comes after the injection excess warning position (T902) have been described with reference to FIGS. 12 and 13. However, it is possible to achieve a certain effect even if determination is to be made as to whether the final injection termination timing (T1204 and T1305) comes after the end position (T106) of the effective injection period.

As described above, according to the third embodiment, it is possible to achieve required torque and avoid the risk of an accidental fire even in the case where an error occurs in the final injection termination timing.

It should be noted that the present invention is not limited to the above-described embodiments, but also includes various variations. For example, the description of the embodiments, which has been provided above in detail, is intended to describe the present invention in an easily understandable manner and, accordingly, the above-described embodiments are not necessarily limited to the one that includes all the configurations described above. In addition, it is possible to replace a part of the configuration of an embodiment with the configuration of another embodiment, and also possible to add, to the configuration of an embodiment, the configuration of another embodiment. Furthermore, it is also possible to add another configuration to a part of the configuration of each embodiment, delete a part of the configuration of each embodiment, and replace a part of the configuration of each embodiment with another configuration.

In the first embodiment described above, the microcomputer (302) as the first control part performs determination by using T106 (the first timing), which is the end position of the effective injection period as shown in FIG. 5. The microcomputer (302) may also perform determination by using T902 (the second timing), which is the injection excess warning position as shown in FIG. 9.

Additionally, each of the above-described configurations and functions, and the like may be partially or entirely implemented by hardware through, for example, a design with an integrated circuit. Moreover, each of the above-described configurations and functions, and the like may be implemented by software with a processor (microcomputer) interpreting and executing a program to implement each function. A program to implement each function and information such as a table and a file can be located in a recording device such as a memory, a hard disk, and a solid state drive (SSD) or a recording medium such as an IC card, an SD card, and a DVD.

REFERENCE SIGNS LIST

314 intake air amount
315 fuel pressure
317 injection pulse signal (for each cylinder)
318 driving current profile of fuel injection valve
319 driving current profile of high-pressure fuel pump
320 driving signal of high-pressure fuel pump
401 total injection amount calculation part
402 multistage injection information calculation part
403 injection pulse width calculation part
404 injection timing calculation part
405 driving current setting part
406 effective injection period excess regulation part
407 pulse signal generation part
408 HPP control value calculation part 409 operating information of internal combustion engine
410 total fuel injection amount
411 multistage injection information
412 injection pulse width
413 definite injection timing
414 control command change value
415 ignition control command value calculation part

The invention claimed is:

1. A control apparatus for an internal combustion engine, comprising a microcomputer configured to:
calculate a second timing further advanced in time from a first timing in an effective injection period of one combustion cycle, the second timing corresponding to an injection excess warning timing of the effective injection period in the one combustion cycle and the first timing corresponding to an end position of the effective injection period in the one combustion cycle, the end position preceding an ignition timing by a predetermined time period required for vaporization of fuel injected into a cylinder of an internal combustion engine;
determine whether a present time is a prediction timing for predicting a final injection termination timing, indicative of a timing of termination of final fuel injection in the one combustion cycle, the prediction timing being prior to a timing at which an initial fuel injection starts in the one combustion cycle,
predict, at the prediction timing, the final injection termination timing, and determine whether the final injection termination timing comes after the first timing or the second timing, wherein the prediction is made using injection control information as of the prediction timing, the injection control information including pulse width information, a fuel pressure, operating information of the internal combustion engine, and an intake air amount of the internal combustion engine; and
control a fuel injector or an ignition device so as to secure time for vaporization of the fuel injected into the cylinder of the internal combustion engine while satisfying a fuel injection amount required in the one combustion cycle when it has been determined that the final injection termination timing comes after the first timing or the second timing.

2. The control apparatus for an internal combustion engine according to claim 1, wherein
the microcomputer is further configured to advance a fuel injection start timing of the fuel injector in the one combustion cycle when it has been determined that the final injection termination timing comes after the first timing.

3. The control apparatus for an internal combustion engine according to claim 1, wherein
the microcomputer is further configured to reduce injection intervals or the number of times of injection per combustion cycle when it has been determined that the final injection termination timing comes after the second timing in a process of multistage injection control.

4. The control apparatus for an internal combustion engine according to claim 1, wherein the microcomputer is further configured to maintain the fuel pressure at a target fuel pressure by:
setting, as the target fuel pressure, a value equal to or more than a target fuel pressure at the time of a throttle valve being fully closed, and
controlling a high-pressure fuel pump such that the fuel pressure corresponds to the target fuel pressure from a first point in time at which the throttle valve is fully closed, to a second point in time at which the intake air amount of the internal combustion engine becomes equal to or less than a predetermined value.

5. The control apparatus for an internal combustion engine according to claim 1, wherein
the microcomputer is further configured to retard the ignition timing when it has been determined that the final injection termination timing comes after the first timing or the second timing.

6. The control apparatus for an internal combustion engine according to claim 1, wherein
the microcomputer is configured to predict the final injection termination timing based on rotation speed of the internal combustion engine.

7. The control apparatus for an internal combustion engine according to claim 4, wherein
the microcomputer is further configured to reduce injection intervals or the number of times of injection per combustion cycle by controlling an increase of the fuel pressure.

8. The control apparatus for an internal combustion engine according to claim 1, wherein
the microcomputer is configured to calculate a predetermined time period by which the second timing is advanced from the first timing based on an increase or a decrease of a rotation speed of the internal combustion engine.

9. The control apparatus for an internal combustion engine according to claim 7, wherein the microcomputer is configured to:
reduce the injection intervals or the number of times of injection such that the final injection termination timing is not later than the second timing, and
calculate a third timing further advanced in time from the second timing, the third timing corresponding to an effective injection period start timing.

* * * * *